(12) United States Patent
Wang et al.

(10) Patent No.: US 12,488,193 B2
(45) Date of Patent: Dec. 2, 2025

(54) DIALOGUE UNDERSTANDING METHOD, APPARATUS, READABLE MEDIUM AND ELECTRONIC DEVICE

(71) Applicant: BEIJING YOUZHUJU NETWORK TECHNOLOGY CO. LTD., Beijing (CN)

(72) Inventors: Yang Wang, Beijing (CN); Yue Feng, Beijing (CN); Hang Li, Beijing (CN)

(73) Assignee: BEIJING YOUZHUJU NETWORK TECHNOLOGY CO. LTD., Beijing (CN)

( * ) Notice: Subject to any disclaimer, the term of this patent is extended or adjusted under 35 U.S.C. 154(b) by 320 days.

(21) Appl. No.: 18/251,874

(22) PCT Filed: Nov. 2, 2021

(86) PCT No.: PCT/CN2021/128127
§ 371 (c)(1),
(2) Date: May 4, 2023

(87) PCT Pub. No.: WO2022/095845
PCT Pub. Date: May 12, 2022

(65) Prior Publication Data
US 2024/0013007 A1    Jan. 11, 2024

(30) Foreign Application Priority Data
Nov. 5, 2020  (CN) .......................... 202011227571.0

(51) Int. Cl.
*G06F 40/35*    (2020.01)
*G06F 40/205*    (2020.01)

(52) U.S. Cl.
CPC ............ *G06F 40/35* (2020.01); *G06F 40/205* (2020.01)

(58) Field of Classification Search
CPC .......... G06F 40/35; G06F 40/205; G06F 40/30
See application file for complete search history.

(56) References Cited

U.S. PATENT DOCUMENTS 9,129,601 B2 *   9/2015   Stent ...................... G10L 15/183
9,495,962 B2 *  11/2016   Govrin .................... G06Q 40/02
(Continued)

FOREIGN PATENT DOCUMENTS

CN        107291828 A1    10/2017
CN        108446322 A      8/2018
(Continued)

OTHER PUBLICATIONS

China National Intellectual Property Administration, Office action issued in CN Application No. 202011227571.0, Jun. 1, 2023, 9 pages.

(Continued)

*Primary Examiner* — Fariba Sirjani
(74) *Attorney, Agent, or Firm* — Alleman Hall & Tuttle LLP

(57) ABSTRACT

A dialog understanding method and apparatus, a readable medium, and an electronic device. The method comprises: acquires dialog content and a preset dialog parsing template, the preset dialog parsing template comprising preset description and at least one c or at least one slot, where in the description information is used for describing a paraphrase of each candidate intention when the preset dialog parsing template comprises at least one candidate intention, and describes a paraphrase of each slot when the preset dialog parsing template at least one comprises slot; and uses the dialog content and the dialog parsing template as inputs of a pre-trained target dialog understanding model to obtain a dialog state corresponding to the dialog content.

9 Claims, 4 Drawing Sheets

(56) References Cited

U.S. PATENT DOCUMENTS

| | | | |
|---|---|---|---|
| 10,002,129 B1* | 6/2018 | D'Souza | G06F 40/289 |
| 10,276,170 B2* | 4/2019 | Gruber | G06F 16/9537 |
| 11,551,159 B2* | 1/2023 | Rastogi | G06F 16/211 |
| 12,087,288 B2* | 9/2024 | Hakkani-Tur | G06F 40/284 |
| 2018/0341698 A1* | 11/2018 | Wang | G06N 5/02 |
| 2019/0214024 A1* | 7/2019 | Gruber | G06F 16/2457 |
| 2020/0019609 A1* | 1/2020 | Yu | G06F 40/186 |
| 2020/0027443 A1* | 1/2020 | Raux | G10L 15/063 |
| 2020/0356592 A1* | 11/2020 | Yada | G06F 16/538 |
| 2021/0192397 A1* | 6/2021 | Rastogi | G06N 20/00 |
| 2021/0217408 A1* | 7/2021 | Hakkani-Tur | G06N 3/02 |
| 2022/0198154 A1 | 6/2022 | Liu et al. | |
| 2022/0382995 A1* | 12/2022 | Lee | G06F 16/3343 |
| 2023/0395075 A1* | 12/2023 | Li | G10L 15/1815 |
| 2024/0013007 A1* | 1/2024 | Wang | G06F 40/205 |

FOREIGN PATENT DOCUMENTS

| | | |
|---|---|---|
| CN | 108763504 A | 11/2018 |
| CN | 111090728 A | 5/2020 |
| CN | 111143540 A | 5/2020 |
| CN | 112307774 A | 2/2021 |

OTHER PUBLICATIONS

ISA China National Intellectual Property Administration, International Search Report issued in PCT Application No. PCT/CN2021/128127, Jan. 27, 2022, WIPO, 11 pages.

China National Intellectual Property Administration, Office Action and Search Report Issued in Application No. 202011227571.0, Dec. 4, 2023, 14 pages.

* cited by examiner

DIALOGUE UNDERSTANDING METHOD, APPARATUS, READABLE MEDIUM AND ELECTRONIC DEVICE

CROSS-REFERENCE TO RELATED APPLICATIONS

This application is a national stage of the International application PCT/CN2021/128127, filed on Nov. 2, 2021, which claims priority to Chinese Application No. 202011227571.0, filed on Nov. 5, 2020, the disclosure of each of which is incorporated by reference herein in its entirety.

TECHNICAL FIELD

The present disclosure relates to the field of natural language processing dialog systems, and in particular, to a dialog understanding method, apparatus, readable medium, and electronic device.

BACKGROUND

With the prosperity and development of human-computer interaction systems, the applications of dialog systems, especially task-oriented dialog systems, are becoming more and more widely used.

SUMMARY

This Summary is provided to introduce concepts in a simplified form that are described in detail in the following Detailed Description section. This Summary section is not intended to identify key features or essential features of the claimed technical solution, nor is it intended to be used to limit the scope of the claimed technical solution.

Embodiments of the present disclosure provide a dialog understanding method, apparatus, readable medium, and electronic device.

In a first aspect, an embodiment of the present disclosure provides a dialog understanding method, the method comprising:

acquiring dialog content and a preset dialog parsing template, the preset dialog parsing template including preset description information and at least one candidate intent and/or at least one slot, the description information being used for describing a paraphrase of each candidate intent when the preset dialog parsing template includes at least one candidate intent, and describing a paraphrase of each slot when the preset dialog parsing template includes at least one slot; and using the dialog content and the dialog parsing template as inputs of a pre-trained target dialog understanding model to obtain a dialog state corresponding to the dialog content, the dialog state being used for characterizing a target intent corresponding to the dialog content in at least one of the candidate intents when the preset dialog parsing template includes at least one candidate intent, and characterizing a target slot corresponding to the dialog content in the at least one of the candidate intents and a slot value of the target slot when the preset dialog parsing template includes at least one slot.

In a second aspect, an embodiment of the present disclosure provides a dialog understanding apparatus, the apparatus comprising:

an acquisition module configured to acquire dialog content and a preset dialog parsing template, the preset dialog parsing template including preset description information and at least one candidate intent and/or at least one slot, the description information being used for describing a paraphrase of each candidate intent when the preset dialog parsing template includes at least one candidate intent, and describing a paraphrase of each slot when the preset dialog parsing template includes at least one slot;

a determination module configured to use the dialog content and the dialog parsing template as inputs of a pre-trained target dialog understanding model to obtain a dialog state corresponding to the dialog content, the dialog state being used for characterizing a target intent corresponding to the dialog content in at least one of the candidate intents when the preset dialog parsing template includes at least one candidate intent, and characterizing a target slot corresponding to the dialog content in the at least one of the candidate intents and a slot value of the target slot when the preset dialog parsing template includes at least one slot.

In a third aspect, an embodiment of the present disclosure provides a computer-readable medium having a computer program stored thereon, which, when executed by a processing apparatus, implement the method provided in any embodiment of the present disclosure.

In a fourth aspect, an embodiment of the present disclosure provides an electronic device, comprising:

a storage device having a computer program stored thereon;

a processing apparatus configured to execute the computer program in the storage device, so as to implement the method provided in any embodiment of the present disclosure.

In the above technical solutions, by means of acquiring dialog content and a preset dialog parsing template, the preset dialog parsing template including preset description information and at least one candidate intent and/or at least one slot, the description information being used for describing a paraphrase of each candidate intent when the preset dialog parsing template includes at least one candidate intent, and describing a paraphrase of each slot when the preset dialog parsing template includes at least one slot; using the dialog content and the dialog parsing template as inputs of a pre-trained target dialog understanding model to obtain a dialog state corresponding to the dialog content, the dialog state being used for characterizing a target intent corresponding to the dialog content in at least one of the candidate intents when the preset dialog parsing template includes at least one candidate intent, and characterizing a target slot corresponding to the dialog content in the at least one of the candidate intents and a slot value of the target slot when the preset dialog parsing template includes at least one slot.

The features and advantages of the present disclosure will be described in detail in the following Detailed Description section.

BRIEF DESCRIPTION OF THE DRAWINGS

The above and other features, advantages and aspects of various embodiments of the present disclosure will become more apparent when taken in conjunction with the accompanying drawings and with reference to the following detailed description. Throughout the drawings, the same or similar reference numbers refer to the same or similar elements. It should be understood that the drawings are schematic and that the originals and elements are not necessarily drawn to scale. In the drawings.

DETAILED DESCRIPTION

Figure 1:
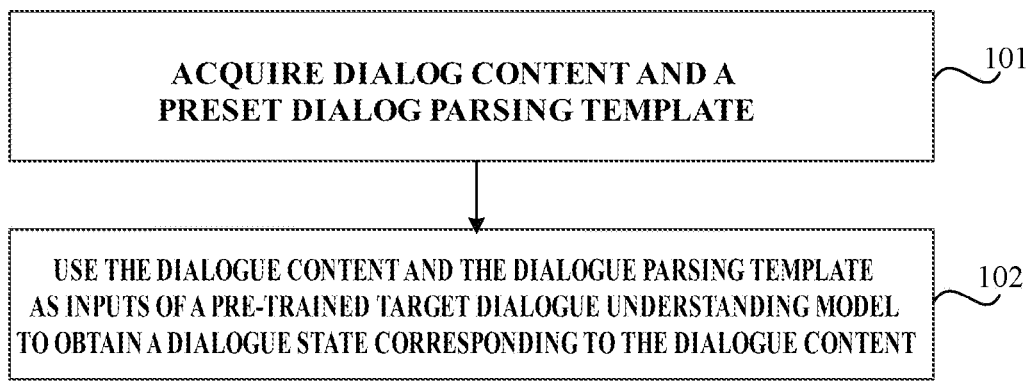
FIG. 1 is a flow chart of a dialog understanding method according to an exemplary embodiment of the present disclosure.

Hereinafter, embodiments of the present disclosure will be described in more detail with reference to the accompanying drawings. Although some embodiments of the present disclosure are shown in the drawings, it should be understood that the present disclosure can be implemented in many different forms, which should not be construed as being limited to embodiments set forth herein, rather, these embodiments are provided for a more thorough and complete understanding of the present disclosure. It should be understood that the drawings and embodiments of the present disclosure should be explained as merely illustrative, and not as a limitation to the protection scope of the present disclosure It should be understood that various steps recited in the method embodiments of the present disclosure may be executed in a different order, and/or executed in parallel. In addition, the method implementations may include additional steps and/or omit to perform illustrated steps. The scope of the present disclosure is not limited in this respect.

The term "including" and its variants as used herein are open includes, that is, "including but not limited to". The term "based on" means "based at least in part on." The term "one embodiment" means "at least one embodiment"; the term "another embodiment" means "at least one additional embodiment"; the term "some embodiments" means "at least some embodiments." Related definitions of other terms will be given in following description.

It should be noted that the concepts of "first" and "second" etc. mentioned in the present disclosure are only used to distinguish between different apparatus, modules or units, and are not used to limit the order of functions performed by these apparatus, modules or units or their interdependence.

It should be noted that modifiers of "one" and "a plurality of" mentioned in the present disclosure are illustrative and not restrictive, and those skilled in the art should understand that they should be construed as "one or more" unless the context clearly indicates otherwise.

The names of messages or information interacted between a plurality of apparatus in the embodiments of the present disclosure are only used for illustration, and are not used to limit the scope of these messages or information.

With the prosperity and development of human-computer interaction systems, the applications of dialog systems, especially task-oriented dialog systems, are becoming more and more widely used. Current task-oriented dialog systems are usually unable to establish associations between different tasks. For example, they cannot perform two tasks of identifying intent and slot at the same time, and usually the Schema corresponding a system is fixed, so a dialog understanding system within one application domain cannot be applied to other domains, that is, model sharing between different domains cannot be realized. For example, in a system for booking hotel rooms, the schema usually includes intent: book a hotel, slot: time period, hotel address, while in a system for booking an airline ticket, the schema usually includes intent: book an airline ticket, slot: time, place of departure, destination. Since the schema of each system is fixed in advance, the system for booking a hotel room cannot share the schema resource with the system for booking an airline ticket, and the two systems cannot establish an association. This will not be conducive to expanding the application field and scope of application for dialog understanding systems.

First of all, before describing the specific implementation of the present disclosure, the specific application scenarios of the present disclosure will be described below. The present disclosure can be applied to human-computer dialog scenarios, for example, the natural semantic recognition process in human-computer dialog systems. In particular, it can be applied to task-oriented dialog systems. That is, the purpose of a dialog between a user and a machine is to enable the machine to help the user complete certain tasks, such as booking an air ticket, booking a hotel room, and inquiring about the weather etc. Usually, each task corresponds to a dialog understanding model, in which a schema is set in advance, and user's dialog content is identified through the dialog understanding model to obtain a dialog intention in the dialog content, as well as a slot and a slots value. However, since the schema corresponding to each task is fixed, and the expression of the schema could be different between different tasks, therefore, even if the same slot is involved in different tasks, it may be impossible to recognize the slot and slot value in the dialog content when using the same dialog understanding model for semantic recognition due to the different expressions for the slot. For example, in a model for booking airline tickets, the schema is preset to include: intent: booking a ticket, slot: departure time, arrival time, departure place, destination; in a model for booking train tickets, the schema is preset to include: intent: booking a ticket, slot: departure time, arrival time, departure station, destination station etc., wherein the "departure time" and "arrival time" in the model for booking air tickets have the same meaning as the "departure time" and "arrival time" in the model for booking train tickets, and the "departure place" and "destination" in the model for booking air tickets have the same meaning as "departure station" and "destination station" in the model for booking train tickets. In related technologies, although the model for booking air tickets and the model for booking train tickets involve the slot with the same meaning, but because the model for booking air tickets and the model for booking train tickets have different expressions for the schema, the dialog status in the dialog content will not be recognized when the model for booking air tickets is applied to book train tickets, that is, models corresponding to different items and different application fields cannot realize the schema data sharing, and thus cannot establish associations between models for different items and different application fields, and cannot realize model sharing, which will not be conducive to expanding the application field and scope of application for dialog understanding model systems.

In order to solve the above technical problems, the present disclosure provides a dialog understanding method, apparatus, readable medium, and electronic device. The method by means of acquiring dialog content and a preset dialog parsing template, the preset dialog parsing template including preset description information and at least one candidate intent and/or at least one slot, the description information being used for describing a paraphrase of each candidate intent when the preset dialog parsing template includes at least one candidate intent, and describing a paraphrase of each slot when the preset dialog parsing template includes at least one slot; and using the dialog content and the dialog parsing template as inputs of a pre-trained target dialog understanding model to obtain a dialog state corresponding to the dialog content, the dialog state being used for characterizing a target intent corresponding to the dialog content in at least one of the candidate intents when the preset dialog parsing template includes at least one candidate intent, and characterizing a target slot corresponding to the dialog content in the at least one of the candidate intents and a slot value of the target slot when the preset dialog parsing template includes at least one slot. In this way, through this target dialog understanding model, it is realized to establish associations between different application fields and different tasks. Through the addition of description information in the preset dialog parsing template, data in different application fields can be shared, thereby being able to expand the application fields of the dialog understanding system effectively and improve the generalization ability of the dialog understanding model in the dialog understanding system.

FIG. 1 is a flow chart of a dialog understanding method according to an exemplary embodiment of the present disclosure; referring to FIG. 1, the method may include following steps:

Step 101, acquiring dialog content and a preset dialog parsing template.

The preset dialog parsing template includes preset description information, and at least one candidate intent and/or at least one slot, the description information being used for describing a paraphrase of each candidate intent when the preset dialog parsing template includes at least one candidate intent, and describing a paraphrase of each slot when the preset dialog parsing template includes at least one slot.

It should be noted that the dialog content may be dialog text and dialog voice, which may include current user sayings, historical user sayings, and historical system replies; the preset dialog parsing template may be a preset schema description, which includes description information, and at least one candidate intent and/or at least one slot, and if the schema description includes at least one slot, it will also include a set of slot values corresponding to each of the slots, and each set of slot values includes a plurality of slot values of the same category.

Figure 2:
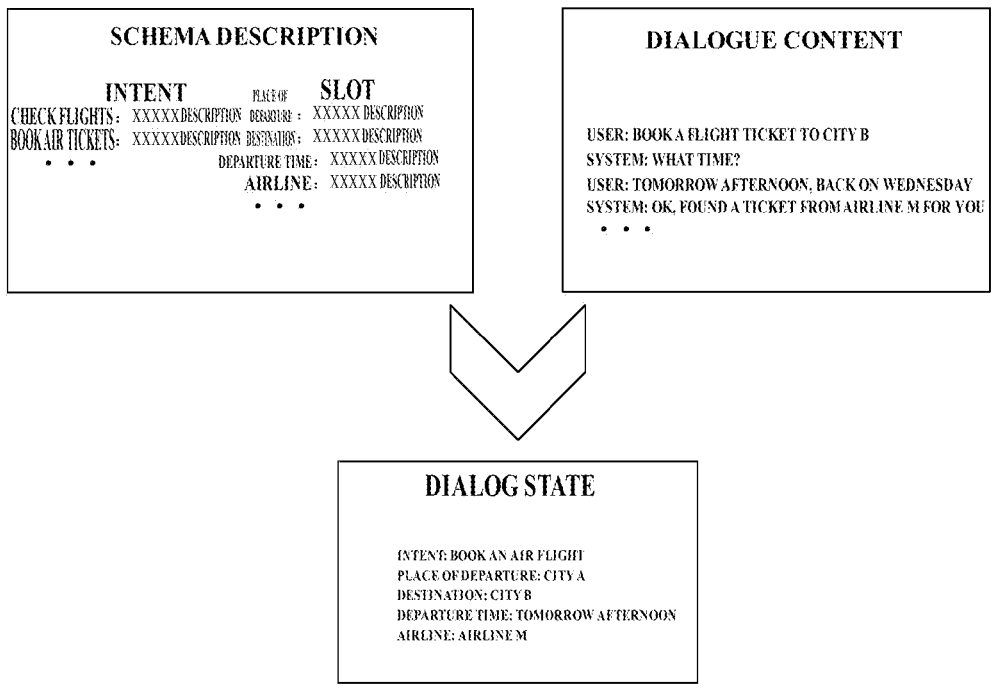
FIG. 2 is a schematic diagram of a piece of dialog data according to an exemplary embodiment of the present disclosure.

Exemplarily, as shown in FIG. 2, FIG. 2 is a schematic diagram of a piece of dialog data according to an exemplary embodiment of the present disclosure; the piece of dialog data includes dialog content, schema description and dialog state. In a system for booking air tickets, the schema description may include 2 candidate intents: query flights, book air tickets, 4 slots: departure place, destination, departure time, and airline, a plurality of slot values: city A, city B, 13:00, airline M, etc., and description information, which includes: a paraphrase for querying a flight, for example, it may be: a real-time query for information such as flight departure time, arrival time, transit stay, flight type, and number of passengers and the like for an airline; a paraphrase for booking a ticket, for example, it may be: purchasing a flight seat evidence, ticket; a paraphrase for the departure place, for example, it may be: the departure city, address, location, airport; a paraphrase for the destination, for example, it may be: the location to be arrived, city, airport, address; a paraphrase for the departure time, for example, it may be: the time of flight taking off, the time of leaving the place of departure; a paraphrase for the airline, for example, it may be: a company that use various aviation aircraft as means of transportation to carry people or goods by air, wherein the description information may not include a paraphrase for the slot value, or may include the paraphrase for the slot value, and when the paraphrase for the slot value is included, the paraphrases for city A and city B in the slot values may be the description of the longitude and latitude corresponding to the city, and a paraphrase for 13:00 may be 1 pm, and a paraphrase for the airline M may be the introduction of the airline.

In step 102, using the dialog content and the dialog parsing template as inputs of a pre-trained target dialog understanding model to obtain a dialog state corresponding to the dialog content.

The dialog state is used for characterizing a target intent corresponding to the dialog content in at least one of the candidate intents when the preset dialog parsing template includes at least one candidate intent, and characterizing a target slot corresponding to the dialog content in the at least one of the candidate intents and a slot value of the target slot when the preset dialog parsing template includes at least one slot.

Exemplarily, here still take FIG. 2 as an example. The target dialog understanding model determines, by identifying the dialog content, that the dialog state corresponding to the dialog content includes a target intention: booking an air ticket, a target slot and corresponding slot value: departure place: City A, destination: City B, airline: Airline M, departure time: tomorrow afternoon.

It should be noted that the target dialog understanding model is used to perform word segmentation processing on the dialog content to obtain a first word segmentation vector sequence, perform word segmentation processing on the description information to obtain a second word segmentation vector sequence, obtain a context semantic vector according to the first word segmentation vector sequence and the second word segmentation vector sequence, and decode the first word segmentation vector sequence and the second word segmentation vector sequence according to the context semantic vector to obtain the dialog state.

In addition, after obtaining the dialog state, the dialog state can further be displayed in a preset display format, wherein the preset display format may be a preset table style or a sequence style. Since the way of displaying the dialog state in a table style is relatively common in related arts, the present disclosure will not go into details here, and implementations of displaying the dialog state in a sequence style may include the following two:

Implementation 1, displaying the dialog state by means of sequence annotation.

Exemplarily, in the dialog content, a request query from a user (request query refers to the query request entered by the user in a dialog system) is "CLS Beijing, what's the weather today?" If the obtained target intention is: check the weather, target slots include: time, place, and others, the dialog status displayed by way of sequence annotation may be: CLS (check the weather), Beijing (place), today (time), what is the weather like (others).

Implementation 2, displaying the dialog state by means of a preset structured sequence.

Exemplarily, still take the request from a user being "CLS Beijing, what's the weather today" as an example, if the preset structured sequence is: [intent; (slot 1: slot value 1); (slot 2: slot value 2) . . . ], corresponding slot values can be intercepted from the request query by way of copying, or the intents and slots can also be generated by vocabulary generation, so that the obtained dialog state can be represented as the preset structured sequence, for example, the representation result is: [check the weather; (place: Beijing); (time: today); (other: what is the weather like) . . . ]. The above examples are only used to display the structured sequence illustratively, and are not used to limit the protection scope of a specific structured sequence. During a specific implementation, the structured sequence may be any sequence style in the related art. The disclosure does not have any limitations on this.

In addition, it should also be noted that the target dialog understanding model is obtained by training as follows: acquiring dialog content samples, the preset dialog parsing template and dialog state samples; and training the model according to the dialog content samples, the preset dialog parsing template and the dialog state samples to obtain the target dialog understanding model.

Figure 3:
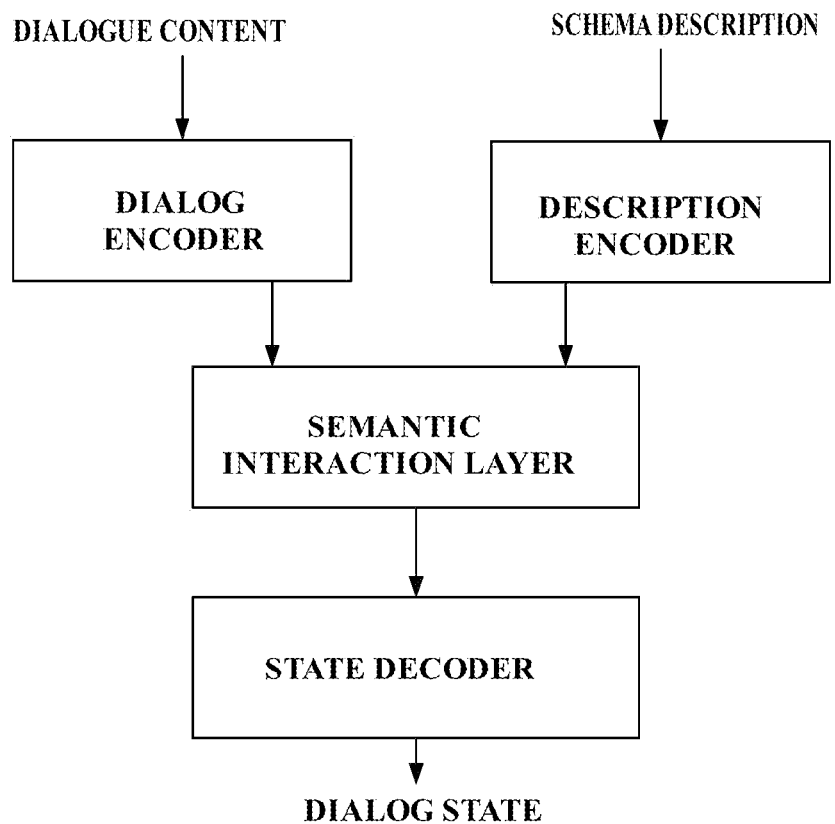
FIG. 3 is a schematic framework diagram of a target dialog understanding model according to an exemplary embodiment of the present disclosure.

Wherein, as shown in FIG. 3, FIG. 3 is a schematic framework diagram of a target dialog understanding model according to an exemplary embodiment of the present disclosure. The target dialog understanding model includes a dialog encoder, a description information encoder, a semantic interaction layer, and a state decoder. the semantic interaction layer being connected with the dialog encoder, the description information encoder, and the state decoder respectively;

The dialog encoder is used to perform word segmentation processing on the dialog content to obtain a first word segmentation vector sequence, and input the first word segmentation vector sequence into the semantic interaction layer;

The description information encoder is used to perform word segmentation processing on the description information to obtain a second word segmentation vector sequence, and input the second word segmentation vector sequence into the semantic interaction layer;

The semantic interaction layer is used to obtain a context semantic vector according to the first word segmentation vector sequence and the second word segmentation vector sequence, and input the context semantic vector into the state decoder;

The state decoder is used to decode the first word segmentation vector sequence and the second word segmentation vector sequence according to the context semantic vector to obtain the dialog state.

Wherein, the target dialog understanding model may be a model based on a Sequence to Sequence (Seq2Seq) algorithm.

Exemplarily, in the target dialog understanding model, the Dialog Encoder divides a dialog text (the dialog text includes current user dialog and historical user dialog) into a first word segmentation vector sequence composed of $t_1$ to $t_n$, and the description information encoder (Schema Encoder) divides at least one candidate intent in the preset dialog parsing template and the description information corresponding to each candidate intent into a word segmentation vector sequence composed of $i_1$ to $i_n$, divides at least one slot and the description information corresponding to each slot into a word segmentation vector sequence composed of $s_1$ to $s_n$, divides at least one slot value and the description information corresponding to each slot value into a word segmentation vector sequence composed of $v_1$ to $v_n$, thus forming a second word segmentation vector sequence composed of the $i_1$ to $i_n$, $s_1$ to $s_n$, and $v_1$ to $v_n$, acquires the similarity of each vector in the first word segmentation vector sequence and each vector in the second word segmentation vector sequence respectively, thereby obtaining a similarity matrix of the first word segmentation vector sequence and the second word segmentation vector sequence, obtains a context semantic vector $C_n$ according to the similarity matrix, and inputs the context semantic vector $C_n$ into the State Decoder, so that the dialog state corresponding to the dialog text is decoded by the state decoder based on the context semantic vector $C_n$. It should be noted that the process of the state decoder obtaining the context semantic vector according to the similarity matrix may refer to the process of obtaining a context semantic vector according to a similarity matrix in the related art, and the process of decoding the dialog state corresponding to the dialog text according to the context semantic vector $C_n$ may refer to any of the processes regarding decoder decoding in the related art. Since the improvement points of the present disclosure are not here, and there are many related technical solutions in the related art, they are not repeated here.

In the above technical solutions, through the target dialog understanding model, it is realized to establish associations between different application fields and different tasks, realized data sharing and model sharing in different application fields, thereby being able to expand the application fields of the dialog understanding system effectively and improve the generalization ability of the dialog understanding model in the dialog understanding system.

Figure 4:
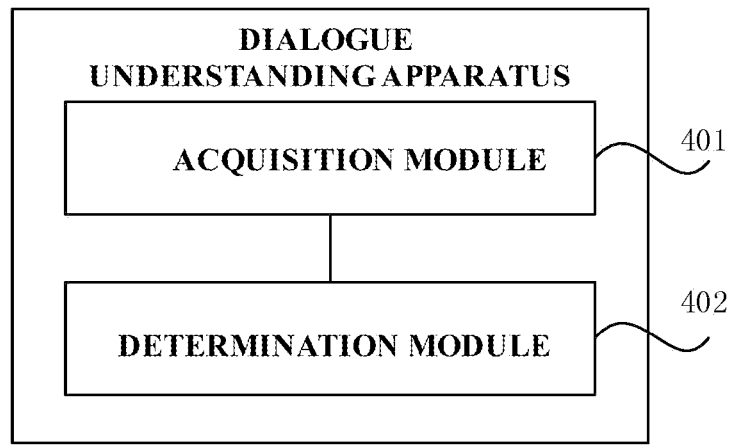
FIG. 4 is a block diagram of a dialog understanding apparatus according to an exemplary embodiment of the present disclosure.

FIG. 4 is a block diagram of a dialog understanding apparatus according to an exemplary embodiment of the present disclosure; referring to FIG. 4, the apparatus may include:

an acquisition module 401 configured to acquire dialog content and a preset dialog parsing template, the preset dialog parsing template including preset description information and at least one candidate intent and/or at least one slot, the description information being used for describing a paraphrase of each candidate intent when the preset dialog parsing template includes at least one candidate intent, and describing a paraphrase of each slot when the preset dialog parsing template includes at least one slot; and an determination module 402 configured to use the dialog content and the dialog parsing template as inputs of a pre-trained target dialog understanding model to obtain a dialog state corresponding to the dialog content, the dialog state being used for characterizing a target intent corresponding to the dialog content in at least one of the candidate intents when the preset dialog parsing template includes at least one candidate intent, and characterizing a target slot corresponding to the dialog content in the at least one of the candidate intents and a slot value of the target slot when the preset dialog parsing template includes at least one slot.

In the above technical solutions, by means of the acquisition module 401 acquiring dialog content and a preset dialog parsing template, the preset dialog parsing template including preset description information and at least one candidate intent and/or at least one slot, the description information being used for describing a paraphrase of each candidate intent when the preset dialog parsing template includes at least one candidate intent, and describing a paraphrase of each slot when the preset dialog parsing template includes at least one slot; by means of the determination module 402 using the dialog content and the dialog parsing template as inputs of a pre-trained target dialog understanding model to obtain a dialog state corresponding to the dialog content, the dialog state being used for characterizing a target intent corresponding to the dialog content in at least one of the candidate intents when the preset dialog parsing template includes at least one candidate intent, and characterizing a target slot corresponding to the dialog content in the at least one of the candidate intents and a slot value of the target slot when the preset dialog parsing template includes at least one slot. Through this target dialog understanding model, it is realized to establish associations between different application fields and different tasks. Through the addition of description information in the preset dialog parsing template, data in different application fields can be shared, thereby being able to expand the application fields of the dialog understanding system effectively and improve the generalization ability of the dialog understanding model in the dialog understanding system.

Optionally, the target dialog understanding model is used to perform word segmentation processing on the dialog content to obtain a first word segmentation vector sequence, perform word segmentation processing on the description information to obtain a second word segmentation vector sequence, obtain a context semantic vector according to the first word segmentation vector sequence and the second word segmentation vector sequence, and decode the first word segmentation vector sequence and the second word segmentation vector sequence according to the context semantic vector to obtain the dialog state.

Optionally, the target dialog understanding model includes a dialog encoder, a description information encoder, a semantic interaction layer, and a state decoder. The semantic interaction layer is connected with the dialog encoder, the description information encoder, and the state decoder respectively;

The dialog encoder is used to perform word segmentation processing on the dialog content to obtain a first word segmentation vector sequence, and input the first word segmentation vector sequence into the semantic interaction layer;

The description information encoder is used to perform word segmentation processing on the description information to obtain a second word segmentation vector sequence, and input the second word segmentation vector sequence into the semantic interaction layer;

The semantic interaction layer is used to obtain a context semantic vector according to the first word segmentation vector sequence and the second word segmentation vector sequence, and input the context semantic vector into the state decoder;

The state decoder is used to decode the first word segmentation vector sequence and the second word segmentation vector sequence according to the context semantic vector to obtain the dialog state.

Figure 5:
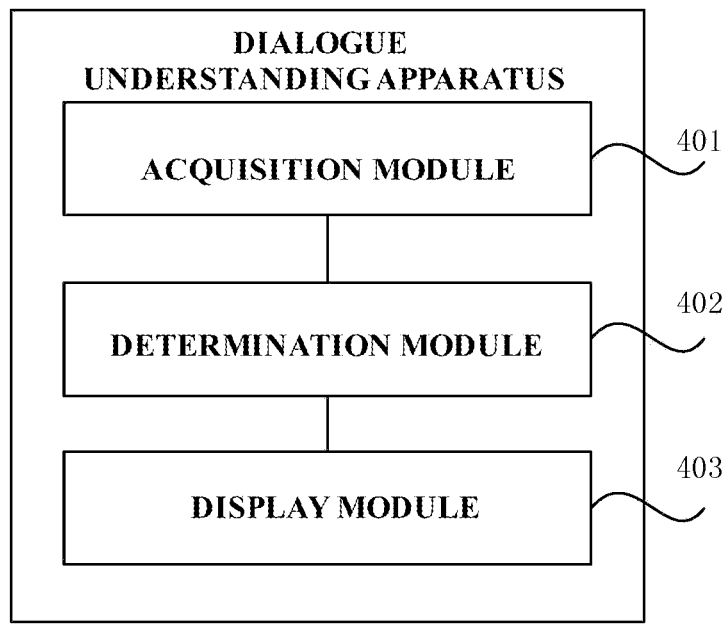
FIG. 5 is a block diagram of a dialog understanding apparatus according to the embodiment shown in FIG. 4 of the present disclosure.

FIG. 5 is a block diagram of a dialog understanding apparatus according to the embodiment shown in FIG. 4 of the present disclosure; referring to FIG. 5, the apparatus may further include:

a display module 403 configured to display the dialog state according to a preset display format.

Optionally, the target dialog understanding model is obtained by training as follows:

acquiring dialog content samples, the preset dialog parsing template and the dialog state samples; and training the model according to the dialog content samples, the preset dialog parsing template and the dialog state samples to obtain the target dialog understanding model.

In this way, through this target dialog understanding model, it is realized to establish associations between different application fields and different tasks. Through the addition of description information in the preset dialog parsing template, data in different application fields can be shared, thereby being able to expand the application fields of the dialog understanding system effectively and improve the generalization ability of the dialog understanding model in the dialog understanding system.

Figure 6:
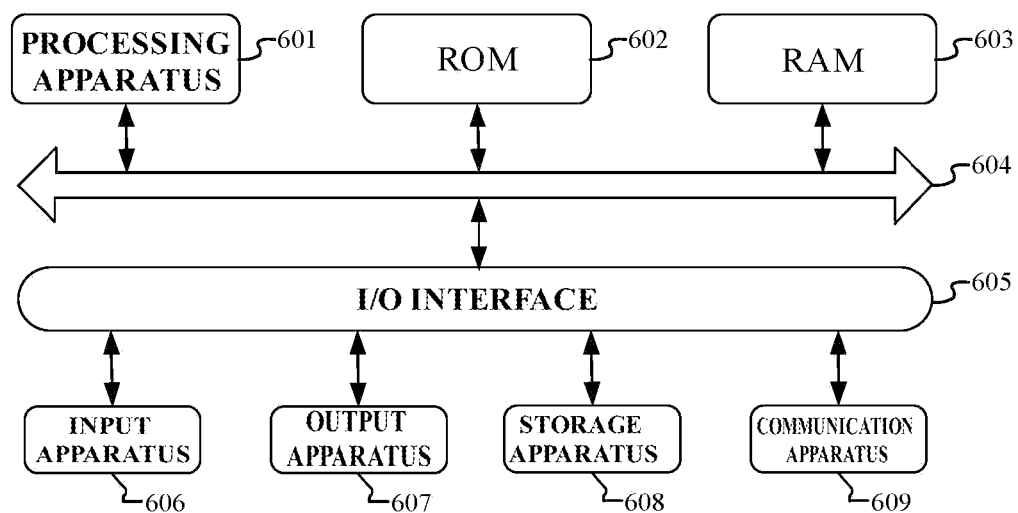
FIG. 6 is a block diagram of an electronic device according to an exemplary embodiment.

Referring to FIG. 6 below, it shows a schematic structural diagram of an electronic device (the above dialog understanding apparatus in FIG. 4 or FIG. 5) 600 suitable for implementing the embodiments of the present disclosure. The terminal device in the embodiment of the present disclosure may include but not limited to a mobile terminal such as a mobile phone, a notebook, a digital broadcast receiver, a PDA (Personal Digital Assistant), a PAD (tablet), a PMP (Portable Multimedia Player), a vehicle-mounted terminal (for example, a vehicle-mounted navigation terminal), etc. and a fixed terminal such as a digital TV, a desktop computer, etc. The electronic device shown in FIG. 6 is only one example, and should not bring any limitation to functions and usage scopes of embodiments of the present disclosure.

As shown in FIG. 6, the electronic device 600 may include a processing apparatus (for example, a central processing unit, a graphics processing unit, etc.) 601, which can execute various appropriate actions and processes according to a program stored in a read-only memory (ROM) 602 or a program loaded from a storage 608 into a random-access memory (RAM) 603. In the RAM 603, various programs and data required for the operation of the electronic device 600 are also stored. The processing apparatus 601, ROM 602, and RAM 603 are connected to each other through a bus 604. An input/output (I/O) interface 605 is also connected to the bus 604.

Generally, the following apparatus can be connected to the I/O interface 605: an input device 606 including for example, a touch screen, a touch pad, a keyboard, a mouse, a camera, a microphone, an accelerometer, a gyroscope, etc.; an output device 607 including for example, a liquid crystal display (LCD), a speaker, a vibrator, etc.; a storage 608 including for example, a magnetic tape, a hard disk, etc.; and a communication apparatus 609. The communication apparatus 609 may allow the electronic device 600 to perform wireless or wired communication with other devices to exchange data. Although FIG. 6 shows an electronic device 600 having various apparatus, it should be understood that it is not required to implement or have all of the illustrated apparatus. It can alternatively be implemented or provided with more or fewer apparatus.

In particular, according to an embodiment of the present disclosure, the process described above with reference to the flowchart can be implemented as a computer software program. For example, an embodiment of the present disclosure includes a computer program product, which includes a computer program carried on a non-transitory computer readable medium, and the computer program contains program code for executing the method shown in the flowchart. In such an embodiment, the computer program may be downloaded and installed from the network through the communication apparatus 609, or installed from the storage 608, or installed from the ROM 602. When the computer program is executed by the processing apparatus 601, above functions defined in the methods of the embodiments of the present disclosure are executed.

It should be noted that above computer-readable medium in the present disclosure may be a computer-readable signal medium or a computer-readable storage medium, or any combination thereof. The computer-readable storage medium may be, for example, but not limited to, an electrical, magnetic, optical, electromagnetic, infrared, or semiconductor system, apparatus, or device, or any combination thereof. More specific examples of computer-readable storage media may include, but are not limited to: an electrical connection with one or more wires, a portable computer disk, a hard disk, a random-access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof. In the present disclosure, a computer-readable storage medium may be any tangible medium that contains or stores a program, and the program may be used by or in combination with an instruction execution system, apparatus, or device. In the present disclosure, a computer-readable signal medium may include a data signal propagated in a baseband or as a part of a carrier wave, in which a computer-readable program code is carried. This propagated data signal can take many forms, including but not limited to electromagnetic signals, optical signals, or any suitable combination thereof. The computer-readable signal medium may also be any computer-readable medium other than the computer-readable storage medium. The computer-readable signal medium may send, propagate, or transmit the program for use by or in combination with the instruction execution system, apparatus, or device. The program code contained on the computer-readable medium can be transmitted by any suitable medium, including but not limited to: wire, optical cable, RF (Radio Frequency), etc., or any suitable combination thereof.

In some implementations, the client and the server can communicate using any currently known or future-developed network protocols, such as HTTP (HyperText Transfer Protocol), and can interconnect with digital data communication (for example, communication network) in any form or medium. Examples of communication networks include local area networks ("LAN"), wide area networks ("WAN"), international network (for example, the Internet), and end-to-end networks (for example, ad hoc end-to-end networks), as well as any currently known or future developed networks.

The above computer-readable medium may be included in above electronic devices; or it may exist alone without being assembled into the electronic device.

The above computer-readable medium carries one or more programs, which, when executed by the electronic device, cause the electronic device:

acquiring dialog content and a preset dialog parsing template, the preset dialog parsing template including preset description information and at least one candidate intent and/or at least one slot, the description information being used for describing a paraphrase of each candidate intent when the preset dialog parsing template includes at least one candidate intent, and describing a paraphrase of each slot when the preset dialog parsing template includes at least one slot; and using the dialog content and the dialog parsing template as inputs of a pre-trained target dialog understanding model to obtain a dialog state corresponding to the dialog content, the dialog state being used for characterizing a target intent corresponding to the dialog content in at least one of the candidate intents when the preset dialog parsing template includes at least one candidate intent, and characterizing a target slot corresponding to the dialog content in the at least one of the candidate intents and a slot value of the target slot when the preset dialog parsing template includes at least one slot.

The computer program code for performing the operations of the present disclosure can be written in one or more programming languages or a combination thereof. The above programming languages include but are not limited to object-oriented programming languages such as Java, Smalltalk, C++, and include conventional procedural programming languages such as "C" language or similar programming languages. The program code can be executed entirely on a user's computer, partly executed on a user's computer, executed as an independent software package, partly executed on a user's computer and partly executed on a remote computer, or entirely executed on a remote computer or server. In the case of involving a remote computer, the remote computer can be connected to a user's computer through any kind of network, including a local area network (LAN) or a wide area network (WAN), or it can be connected to an external computer (for example, connected by using Internet provided by an Internet service provider).

The flowcharts and block diagrams in the accompanying drawings illustrate possible architecture, function, and operation implementations of a system, method, and computer program product according to various embodiments of the present disclosure. In this regard, each block in a flowchart or block diagram may represent a module, program segment, or part of code, which contains one or more executable instructions for realizing specified logic functions. It should also be noted that, in some alternative implementations, functions marked in a block may also occur in a different order than the order marked in the drawings. For example, two blocks shown in succession can actually be executed substantially in parallel, and they can sometimes be executed in the reverse order, depending on functions involved. It should also be noted that each block in a block diagram and/or flowchart, and the combination of blocks in a block diagram and/or flowchart, can be implemented by a dedicated hardware-based system that performs the specified functions or operations, or it can be implemented by a combination of dedicated hardware and computer instructions.

The modules involved in the embodiments of the present disclosure can be implemented in software or hardware. Wherein, the name of the module does not constitute a limitation on the module itself under certain circumstances. For example, the acquisition module may also be described as "a module for acquiring at least two Internet Protocol addresses".

The functions described herein above may be performed at least in part by one or more hardware logic components. For example, without limitation, exemplary types of hardware logic components that can be used include: Field Programmable Gate Array (FPGA), Application Specific Integrated Circuit (ASIC), Application Specific Standard Product (ASSP), System on Chip (SOC), Complex Programmable Logical device (CPLD) and so on.

In the context of the present disclosure, a machine-readable medium may be a tangible medium, which may contain or store a program for use by the instruction execution system, apparatus, or device or in combination with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. More specific examples of machine-readable storage media may include an electrical connection based on one or more wires, a portable computer disk, a hard disk, a random-access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof.

According to one or more embodiments of the present disclosure, Example 1 provides a dialog understanding method, comprising: acquiring dialog content and a preset dialog parsing template, the preset dialog parsing template including preset description information and at least one candidate intent and/or at least one slot, the description information being used for describing a paraphrase of each candidate intent when the preset dialog parsing template includes at least one candidate intent, and describing a paraphrase of each slot when the preset dialog parsing template includes at least one slot; and using the dialog content and the dialog parsing template as inputs of a pre-trained target dialog understanding model to obtain a dialog state corresponding to the dialog content, the dialog state being used for characterizing a target intent corresponding to the dialog content in at least one of the candidate intents when the preset dialog parsing template includes at least one candidate intent, and characterizing a target slot corresponding to the dialog content in the at least one of the candidate intents and a slot value of the target slot when the preset dialog parsing template includes at least one slot.

According to one or more embodiments of the present disclosure, Example 2 provides the method of Example 1, the target dialog understanding model is used to perform word segmentation processing on the dialog content to obtain a first word segmentation vector sequence, perform word segmentation processing on the description information to obtain a second word segmentation vector sequence, obtain a context semantic vector according to the first word segmentation vector sequence and the second word segmentation vector sequence, and decode the first word segmentation vector sequence and the second word segmentation vector sequence according to the context semantic vector to obtain the dialog state.

According to one or more embodiments of the present disclosure, Example 3 provides the method of Example 2, the target dialog understanding model includes a dialog encoder, a description information encoder, a semantic interaction layer, and a state decoder. the semantic interaction layer being connected with the dialog encoder, the description information encoder, and the state decoder respectively; the dialog encoder is used to perform word segmentation processing on the dialog content to obtain a first word segmentation vector sequence, and input the first word segmentation vector sequence into the semantic interaction layer; the description information encoder is used to perform word segmentation processing on the description information to obtain a second word segmentation vector sequence, and input the second word segmentation vector sequence into the semantic interaction layer; the semantic interaction layer is used to obtain a context semantic vector according to the first word segmentation vector sequence and the second word segmentation vector sequence, and input the context semantic vector into the state decoder; the state decoder is used to decode the first word segmentation vector sequence and the second word segmentation vector sequence according to the context semantic vector to obtain the dialog state.

According to one or more embodiments of the present disclosure, Example 4 provides the method of Example 1, after obtaining the dialog state corresponding to the dialog content, the method further comprises: displaying the dialog state according to a preset display format.

According to one or more embodiments of the present disclosure, Example 5 provides the methods of Example 1 to Example 4, the target dialog understanding model is obtained by training as follows: acquiring dialog content samples, the preset dialog parsing template and dialog state samples; and training the model according to the dialog content samples, the preset dialog parsing template and the dialog state samples to obtain the target dialog understanding model.

According to one or more embodiments of the present disclosure, Example 6 provides a dialog understanding apparatus, including: an acquisition module configured to acquire dialog content and a preset dialog parsing template, the preset dialog parsing template including preset description information and at least one candidate intent and/or at least one slot, the description information being used for describing a paraphrase of each candidate intent when the preset dialog parsing template includes at least one candidate intent, and describing a paraphrase of each slot when the preset dialog parsing template includes at least one slot; and a determination module configured to use the dialog content and the dialog parsing template as inputs of a pre-trained target dialog understanding model to obtain a dialog state corresponding to the dialog content, the dialog state being used for characterizing a target intent corresponding to the dialog content in at least one of the candidate intents when the preset dialog parsing template includes at least one candidate intent, and characterizing a target slot corresponding to the dialog content in the at least one of the candidate intents and a slot value of the target slot when the preset dialog parsing template includes at least one slot.

According to one or more embodiments of the present disclosure, Example 7 provides the apparatus of Example 6, the target dialog understanding model is used to perform word segmentation processing on the dialog content to obtain a first word segmentation vector sequence, perform word segmentation processing on the description information to obtain a second word segmentation vector sequence, obtain a context semantic vector according to the first word segmentation vector sequence and the second word segmentation vector sequence, and decode the first word segmentation vector sequence and the second word segmentation vector sequence according to the context semantic vector to obtain the dialog state.

According to one or more embodiments of the present disclosure, Example 8 provides the apparatus of Example 7, the target dialog understanding model includes a dialog encoder, a description information encoder, a semantic interaction layer, and a state decoder. the semantic interaction layer being connected with the dialog encoder, the description information encoder, and the state decoder respectively; the dialog encoder is used to perform word segmentation processing on the dialog content to obtain a first word segmentation vector sequence, and input the first word segmentation vector sequence into the semantic interaction layer; the description information encoder is used to perform word segmentation processing on the description information to obtain a second word segmentation vector sequence, and input the second word segmentation vector sequence into the semantic interaction layer; the semantic interaction layer is used to obtain a context semantic vector according to the first word segmentation vector sequence and the second word segmentation vector sequence, and input the context semantic vector into the state decoder; the state decoder is used to decode the first word segmentation vector sequence and the second word segmentation vector sequence according to the context semantic vector to obtain the dialog state.

According to one or more embodiments of the present disclosure, Example 9 provides the apparatus of Example 6, the apparatus further comprises: a display module configured to display the dialog state according to a preset display format.

According to one or more embodiments of the present disclosure, Example 10 provides the apparatus of Example 6 to Example 9, the target dialog understanding model is obtained by training as follows: acquiring dialog content samples, the preset dialog parsing template and dialog state samples; and training the model according to the dialog content samples, the preset dialog parsing template and the dialog state samples to obtain the target dialog understanding model.

According to one or more embodiments of the present disclosure, Example 11 provides a computer-readable medium having a computer program stored thereon, which, when executed by a processing apparatus, implements the steps of the method in Example 1 to Example 5.

According to one or more embodiments of the present disclosure, Example 12 provides an electronic device, comprising: a storage device having a computer program stored thereon; a processing apparatus configured to execute the computer program in the storage device, to implement the steps of the method in Example 1 to Example 5.

The above description is only preferred embodiments of the present disclosure and an explanation to the technical principles applied. Those skilled in the art should understand that the scope of disclosure involved in this disclosure is not limited to technical solutions formed by specific combination of above technical features, and should also cover other technical solutions formed by arbitrarily combining above technical features or equivalent features thereof without departing from above disclosed concept. For example, those technical solutions formed by exchanging of above features and technical features disclosed in the present disclosure (but not limited to) having similar functions with each other.

In addition, although various operations are depicted in a specific order, this should not be understood as requiring these operations to be performed in the specific order shown or performed in a sequential order. Under certain circumstances, multitasking and parallel processing may be advantageous. Likewise, although several specific implementation details are included in above discussion, these should not be construed as limiting the scope of the present disclosure. Certain features that are described in the context of separate embodiments can also be implemented in combination in a single embodiment. Conversely, various features described in the context of a single embodiment can also be implemented in multiple embodiments individually or in any suitable sub-combination.

Although the subject matter has been described in a language specific to structural features and/or logical actions of the method, it should be understood that the subject matter defined in the appended claims is not necessarily limited to the specific features or actions described above. Rather, the specific features and actions described above are merely exemplary forms of implementing the claims. Regarding the apparatus in the above embodiments, the specific manner in which each module performs operations has been described in detail in the method embodiments, which will not be described in detail here.

What is claimed is:

1. A dialog understanding method, the method comprising:
   acquiring dialog content and a preset dialog parsing template, the preset dialog parsing template including preset description information and at least one candidate intent and/or at least one slot, the description information being used for describing a paraphrase of each candidate intent when the preset dialog parsing template includes at least one candidate intent, and describing a paraphrase of each slot when the preset dialog parsing template includes at least one slot; and
   using the dialog content and the dialog parsing template as inputs of a pre-trained target dialog understanding model to obtain a dialog state corresponding to the dialog content, the dialog state being used for characterizing a target intent corresponding to the dialog content in at least one of the candidate intents when the preset dialog parsing template includes at least one candidate intent, and characterizing a target slot corresponding to the dialog content in the at least one of the slots and a slot value of the target slot when the preset dialog parsing template includes at least one slot,
   wherein the target dialog understanding model is used to perform word segmentation processing on the dialog content to obtain a first word segmentation vector sequence, perform word segmentation processing on the description information to obtain a second word segmentation vector sequence, obtain a context semantic vector according to the first word segmentation vector sequence and the second word segmentation vector sequence, and decode the first word segmentation vector sequence and the second word segmentation vector sequence according to the context semantic vector to obtain the dialog state.

2. The method according to claim 1, wherein the target dialog understanding model includes a dialog encoder, a description information encoder, a semantic interaction layer, and a state decoder, the semantic interaction layer being connected with the dialog encoder, the description information encoder, and the state decoder respectively;
   the dialog encoder is configured to perform word segmentation processing on the dialog content to obtain the first word segmentation vector sequence, and input the first word segmentation vector sequence into the semantic interaction layer;
   the description information encoder is configured to perform word segmentation processing on the description information to obtain the second word segmentation vector sequence, and input the second word segmentation vector sequence into the semantic interaction layer;
   the semantic interaction layer is configured to obtain the context semantic vector according to the first word segmentation vector sequence and the second word segmentation vector sequence, and input the context semantic vector into the state decoder; and
   the state decoder is configured to decode the first word segmentation vector sequence and the second word segmentation vector sequence according to the context semantic vector to obtain the dialog state.

3. The method according to claim 1, wherein after obtaining the dialog state corresponding to the dialog content, the method further comprises:
displaying the dialog state according to a preset display format.

4. The method according to claim 1, wherein the target dialogue understanding model is obtained by training as follows:
acquiring dialog content samples, the preset dialogue parsing template and dialog state samples; and
training the model according to the dialog content samples, the preset dialog parsing template and the dialog state samples to obtain the target dialog understanding model.

5. A non-transitory computer-readable medium having a computer program stored thereon, which, when executed by a processing apparatus, implements the steps of the method according to claim 1.

6. An electronic device comprising:
a storage device having a computer program stored thereon;
a processing apparatus configured to execute the computer program in the storage device, to implement the following steps:
acquiring dialog content and a preset dialog parsing template, the preset dialog parsing template including preset description information and at least one candidate intent and/or at least one slot, the description information being used for describing a paraphrase of each candidate intent when the preset dialog parsing template includes at least one candidate intent, and describing a paraphrase of each slot when the preset dialog parsing template includes at least one slot; and
using the dialog content and the dialog parsing template as inputs of a pre-trained target dialog understanding model to obtain a dialog state corresponding to the dialog content, the dialog state being used for characterizing a target intent corresponding to the dialog content in at least one of the candidate intents when the preset dialog parsing template includes at least one candidate intent, and characterizing a target slot corresponding to the dialog content in the at least one of the slots and a slot value of the target slot when the preset dialog parsing template includes at least one slot,
wherein the target dialog understanding model is used to perform word segmentation processing on the dialog content to obtain a first word segmentation vector sequence, perform word segmentation processing on the description information to obtain a second word segmentation vector sequence, obtain a context semantic vector according to the first word segmentation vector sequence and the second word segmentation vector sequence, and decode the first word segmentation vector sequence and the second word segmentation vector sequence according to the context semantic vector to obtain the dialog state.

7. The electronic device of claim 6, wherein the target dialog understanding model includes a dialog encoder, a description information encoder, a semantic interaction layer, and a state decoder, the semantic interaction layer being connected with the dialog encoder, the description information encoder, and the state decoder respectively;
the dialog encoder is configured to perform word segmentation processing on the dialog content to obtain the first word segmentation vector sequence, and input the first word segmentation vector sequence into the semantic interaction layer;
the description information encoder is configured to perform word segmentation processing on the description information to obtain the second word segmentation vector sequence, and input the second word segmentation vector sequence into the semantic interaction layer;
the semantic interaction layer is configured to obtain the context semantic vector according to the first word segmentation vector sequence and the second word segmentation vector sequence, and input the context semantic vector into the state decoder; and
the state decoder is configured to decode the first word segmentation vector sequence and the second word segmentation vector sequence according to the context semantic vector to obtain the dialog state.

8. The electronic device of claim 6, wherein after obtaining the dialog state corresponding to the dialog content, the method further comprises:
displaying the dialog state according to a preset display format.

9. The electronic device of claim 6, wherein the target dialog understanding model is obtained by training as follows:
acquiring dialog content samples, the preset dialog parsing template and dialog state samples; and
training the model according to the dialog content samples, the preset dialog parsing template and the dialog state samples to obtain the target dialog understanding model.

* * * * *